Figure 1:
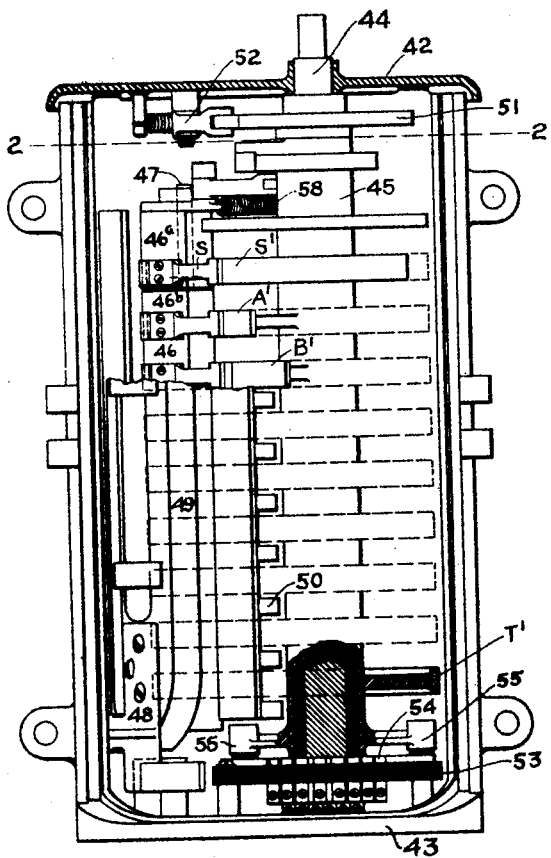

No. 798,375.  
PATENTED AUG. 29, 1905.  
H. E. WHITE.  
CONTROLLER.  
APPLICATION FILED APR. 7, 1904.

2 SHEETS—SHEET 1.

Witnesses:  
Irving E. Steers.

Inventor,  
Harold E. White.  
by Albert G. Davis  
Att'y.

No. 798,375. PATENTED AUG. 29, 1905.
H. E. WHITE.
CONTROLLER.
APPLICATION FILED APR. 7, 1904.
2 SHEETS—SHEET 2.
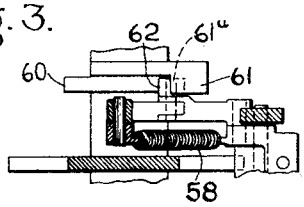
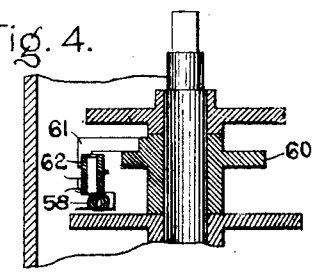
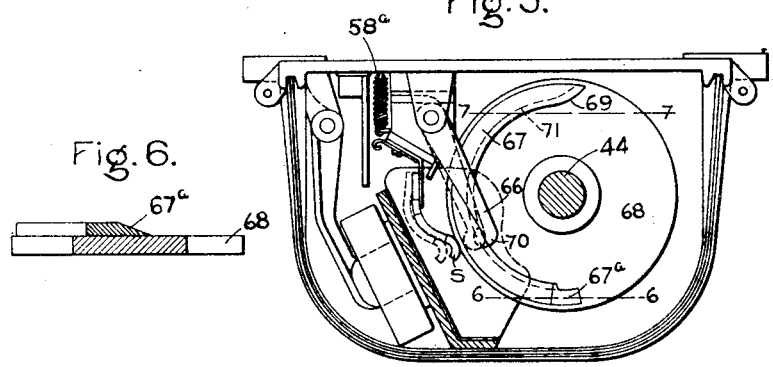
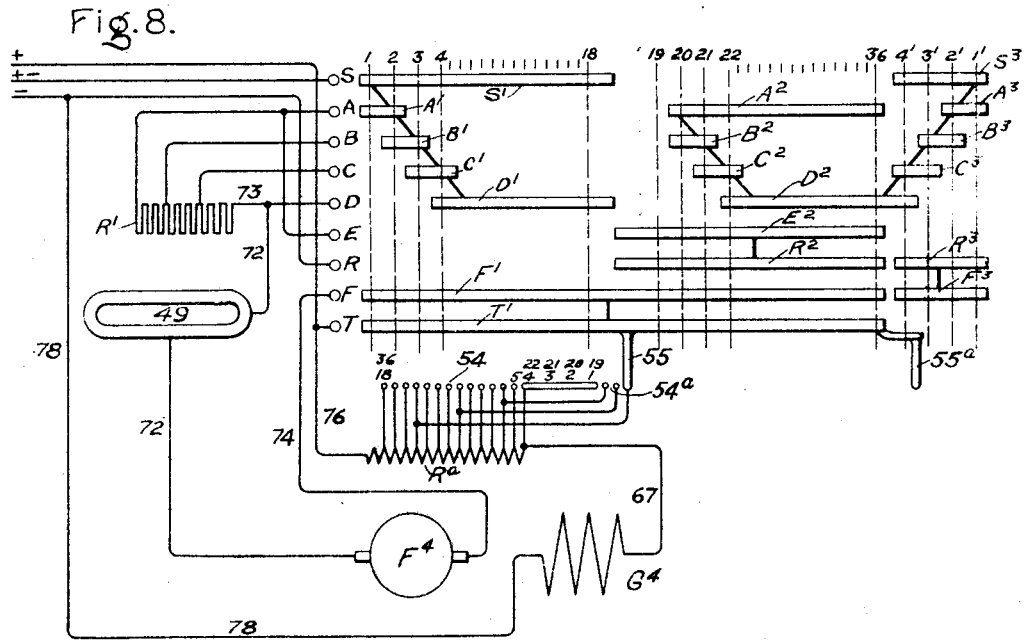
Witnesses:
Irving E. Stearns
Helen Orford
Inventor,
Harold E. White.
by Albert G. Davis
Att'y.

UNITED STATES PATENT OFFICE.

HAROLD E. WHITE, OF SCHENECTADY, NEW YORK, ASSIGNOR TO GENERAL ELECTRIC COMPANY, A CORPORATION OF NEW YORK.

CONTROLLER.

No. 798,375.   Specification of Letters Patent.   Patented Aug. 29, 1905.

Application filed April 7, 1904. Serial No. 201,999.

*To all whom it may concern:*

Be it known that I, HAROLD E. WHITE, a citizen of the United States, residing at Schenectady, county of Schenectady, State of New York, have invented certain new and useful Improvements in Controllers, of which the following is a specification.

My invention relates to systems of motor control, and more particularly to the control of motors operated on a multivoltage system of electrical distribution. The purpose of such operation is to obtain a wide range of speed variation with a minimum size of motor, and in order to accomplish this it is usual to employ, in addition to the starting resistance, which is included in series with the motor-armature, a field resistance in series with the field-winding and to vary these resistances and the circuit connections, so as to obtain the desired speed variations. A system of this type is disclosed in Patent No. 732,247, granted to E. R. Whitney June 30, 1903.

The present invention has to do particularly with the controller by which the necessary changes in circuit connections are made.

I have found that in the operation of controllers heretofore employed for making these changes in circuit connections when the controller-cylinder is rotated far enough to connect the motor to the high-potential mains and is then suddenly returned to a low-potential position the momentum of the motor-armature, together with the slowness of the field in building up, causes the armature to act as a powerful electric brake and restore power to the line in a reverse direction. This is objectionable, and in the case of a three-wire system the current thus produced may be sufficient to operate the circuit-breaker or other protective devices of the system.

One of the objects of my invention is to overcome this difficulty, and in doing so I make use of means by which a contact-finger included in the low-potential circuit is moved from engaging position when the controller is moved backward from a high to a low potential position and which will not make contact until the controller is turned to the "off" position and again turned forward.

Another object of my invention is to provide a novel controlling-switch by which in changing the motor connections from the low to the high potential source the starting resistance is connected in series with the motor-armature between the high-potential mains before the armature connection between the low-potential mains is broken. Then the latter connection is broken, and the resistance in the high-potential circuit is gradually cut out, thus obtaining a transition from low to high potential by gradual stages and without at any time opening the motor-circuit.

My invention also comprises other features and advantages, which will be best understood upon reference to the following description, taken in connection with the accompanying drawings, and the parts, improvements, and combinations which I regard as my invention will be specifically pointed out in the appended claims.

Figure 2:
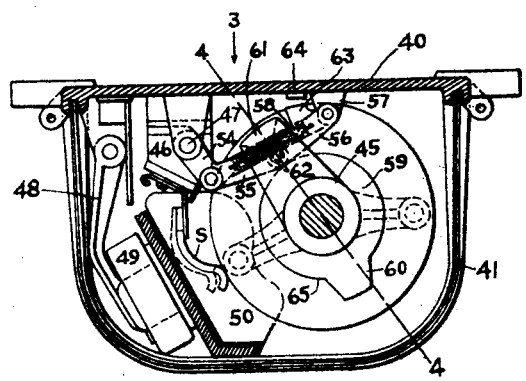

Referring to the accompanying drawings, Figure 1 is an elevation of a controller embodying the features of my invention. Fig. 2 is a section thereof, taken on the line 2 2 of Fig. 1 and illustrating particularly the means for operating the movable contact-finger. Fig. 3 is an elevation of the mechanism for moving the contact-finger viewed in the direction of the arrow 3 in Fig. 2. Fig. 4 is a vertical section of said means and an adjacent portion of the controller, taken on the line 4 4 of Fig. 2. Fig. 5 is a sectional view similar to Fig. 2, illustrating a modified means for moving the contact-finger from engaging position. Figs. 6 and 7 are sections taken on the lines 6 6 and 7 7, respectively, of Fig. 5; and Fig. 8 is a diagram of the motor-circuits and the controller-contacts.

Throughout these several views like characters refer to like parts.

In the said drawings, 40 designates the back plate of the controller-casing, and 41 the cover. Located within this casing and bearing in the end plates 42 and 43 is the controller-shaft 44, upon which is located the usual cylinder 45, which carries the movable contact-segments. Three of these segments S' A' B' are shown in full in Fig. 1, while the position of the others is indicated by dotted lines. The usual contact-fingers for engagement with the movable contact-segments are mounted on a block of insulation 46, which extends parallel to the cylinder 45. The insulating-block 46 is divided into two sections $46^a$ and $46^b$. The section $46^b$ is securely fastened to the back 40 of the controller-casing, and the section $46^a$, which carries the uppermost contact-finger, is mounted on a pivot 47, extending down into the section 46ª, and is rotatable into and out of engaging position with the contact-segment S', as indicated by the full and dotted line positions in Fig. 2. The controller is provided with the usual pivoted pole-piece 48, carrying a blow-out magnet 49 and provided with the usual arc-deflectors 50, which embrace the contact-segments and fingers when in the closed position. (Illustrated in Fig. 2.) The upper end of the cylinder 45 is provided with the usual notched disk 51, with which the spring-pressed lever 52 is adapted to engage to hold the cylinder 45 in its various operative positions. At the lower end of the cylinder 45 is a horizontal disk 53, of insulating material, upon which is mounted a range of fixed contacts 54, with which the movable contacts 55, secured to the lower end of the cylinder 45 and in electrical connection with the lowermost segment T', are adapted to engage.

The movable contact-finger S may be operated in any desired manner by the controller-shaft 44, and for this purpose I have illustrated two different constructions. One of these is shown in Figs. 1 to 4 and the other in Figs 5 to 7. In the former construction the pivot 47 of the insulating-section 46ª, carrying the movable contact-finger, is provided with a crank 54, which is connected at its upper end by means of a toggle composed of the links 55 and 56 to a lug 57 on the back plate of 40 of the controller-casing. By the movement of the toggle toward and from the shaft the crank 54 is rocked, so as to move the contact-finger S into and out of engaging position. The outward movement of the toggle is limited by a stop 63 on the toggle-link 56, engaging the coöperating stop 64 on the back plate 40, and the forward movement is limited by the antifriction-roller 62 on the toggle engaging the face 65 of the actuating-cam 59, mounted on the controller-shaft 44. The antifriction-roller 62 is mounted on the center of the toggle at the upper end of the connecting-pivot 61ª. The coiled spring 58, located between a lug on the crank 54 and the lug 64 on the back plate 40, serves to carry the toggle to either limiting position when once carried in either direction beyond the center line. The cam 59, as clearly shown in Figs. 3 and 4, comprises a lower portion having a projection 60, and an upper overhanging portion having a downward projection 61. The lower projection 60 engages the roller 62 to move the finger S into non-engaging position, and, as hereinafter more fully explained, is located so that in the forward rotation of the controller-cylinder 45 it will actuate the said finger only after the motor connections with the low-potential source have been made and before the controller has reached a high-potential position. The overhanging projection 61, on the other hand, engages the roller 62 to move the finger S into engaging position and is so located that it engages the roller only after the controller reaches its off position and is again moved forward.

In the finger-operating mechanism (illustrated in Figs. 5 to 7) the pivot 47 is provided with the laterally-projecting crank-arm 66, which is adapted to engage at its outer end 70 with the elongated cam 67 on the disk 68, secured to the controller-shaft 44. As clearly shown in Fig. 6, one end 67ª of this cam meets the disk 68 at an inclination, while the other end of the cam is provided with an upturned lip 69, which serves to guide the end 70 of the arm 66 into the cam-groove 71 upon its inner face. From this it will be seen that in the movement of the disk 68 in one direction the end 70 of the arm 66 will engage the groove 71, as indicated by the full-line position of said arm in Fig. 5, so as to keep the contact-finger S in engaging position, while in the return movement of the disk the arm 66 will not lie in the groove 71, but will pass over the upper surface of the cam 67, as clearly illustrated by the dotted-line position of the arm 66 in Fig. 5, the inclined end 67ª of the cam 67 serving to guide the arm 66 to the upper surface of the cam and the lip 69 (illustrated in Fig. 7) serving to guide the arm 66 into the groove 71. In this form the cam 67 is so positioned that it will hold the finger S in its engaging position against the force of the spring 58ª during the movement of the controller through the various low-potential positions, but will free it just before reaching the first high-potential position. This is accomplished by locating the parts so that the outer end of the arm 66 will escape past the end 67ª of the cam 67 just before the high-potential position is reached and will be engaged by the lip 69 before the first low-potential position is reached in the forward movement of the controller from its off position.

Referring to the diagram of Fig. 8, S A B C D E R F T designate the contact-fingers, and the same letters, with exponents 1, 2, and 3, designate the contact-segments which are adapted to be moved into engagement therewith. The conducting-wires of the multi-voltage system (in the present case a three-wire system) are connected to the contact-fingers R S T, the negative (−) wire being connected to the contact-finger R, the positive (+) wire to the contact-finger T, and the neutral (±) wire to the contact-finger S. The starting resistance R' is divided into sections by suitable leads, connecting with the contact-fingers A, B, C, D, and E, the fingers A and E connecting to the same point of said resistance. At the point 73, running from the contact-finger D, is tapped a wire 72, which leads through the blow-out coil 49 to one terminal of the motor-armature F', the other terminal of the said armature being connected by a wire 74 with the contact-finger F. The field resistance Rª has one end connected by a lead 76 to the positive wire at a point adjacent to the contact-finger T and its other end by a lead 67 to the field-winding $G^4$ of the motor, the other terminal of said field-winding being connected by a wire 78 with the negative supply-wire. The field-resistance $R^a$ is divided into a plurality of sections by suitable leads connected to the individual contacts of the range 54, located at the lower end of the controller-cylinder. This resistance is also divided into larger groups by leads running to the contacts $54^a$. The contacts 54 and $54^a$ are adapted to be engaged by the contacts 55 and $55^a$ in electrical connection with the lowermost segment T'. In this diagram the row of figures from 1 to 36 just above the segments S' and $A^2$ and the double row just above the contacts 54 designate corresponding positions of the parts. For example, when the controller is in position 4 the contact-fingers S, C, D, F, and T will be in engagement with the corresponding segments S', C', D', F', and T' and the contact 55 will be in engagement with the contact in the range 54 marked 4.

In operation when the controller is moved to the first starting position, which is that illustrated in Figs. 1 and 2, the field-winding $G^4$ will be connected to the high-potential source from the positive wire to the negative wire by way of the contact-finger T, segment T', contact 55, the elongated contact of the range 54, lead 67, field-winding $G^4$, and lead 78, and the armature will be connected to the low-potential source, and its circuit will extend from the positive wire to the neutral wire by way of the contact-finger T, segments T' F', contact-finger F, lead 74, armature-lead 4, lead 72, starting resistance R', contact-finger A, segments A' S', and contact-finger S. In this position it will be seen that all the starting resistance is included in circuit with the motor-armature, while none of the field resistance is included in circuit with the field-winding. In the movement of the controller through the first four positions the contact 55 remains in engagement with the elongated contact 54, so that the field-circuit remains unchanged, but the sections of the starting-winding R' are gradually cut out through the engagement of the contact-fingers A, B, C, and D with the segments A', B', C', and D'. On the other hand, in the movement of the controller from the fourth to the eighteenth position the armature-circuit remains unchanged—that is, the starting resistance remains out of circuit—while the resistance $R^a$ is gradually cut into the field-circuit. Thus throughout the entire movement of the controller from the first to the eighteenth position the speed of the motor is increased first by cutting out the starting resistance and then by cutting in the field resistance. In passing from the eighteenth to the nineteeth position the armature connections are changed from the low-potential source to the high-potential source. This is accomplished without at any time breaking the motor-circuit, and the construction by which this is done, as previously pointed out, constitutes one feature of my invention. In this movement of the controller it will be seen that the contact-fingers E and R engage the contact-segments $E^2$ and $R^2$ before the contact-fingers S and D leave the contact-segments S' and D'. While the contact-fingers are thus overlapped, the motor-armature is connected between the positive and neutral wires without any intervening resistance and between the positive and negative wires with the starting resistance R' intervening. The circuits thus established may be traced as follows: from the positive wire to the contact-finger T, contact-segments T' F', contact-finger F, lead 74, armature $F^4$, lead 72 to the point 73, thence by one branch through the contact-finger D, contact-segments D' C' B' A' S', and contact-finger S to the neutral wire and by another branch from the point 73 through the resistance R', contact-finger E, contact-segments $E^2$ $R^2$, contact-finger R to the negative wire. A further movement of the controller-handle breaks the connections of the contact-fingers S and D with their segments S' and D', thus breaking the branch leading from the point 73 to the negative wire and leaving the motor-armature connected between the high-potential mains, with the resistance R' in series. Also in passing from the position 18 to 19 the contact $55^a$ by engagement with the fixed contacts $54^a$ cuts the field resistance $R^a$ out of the field-circuit. Thus the position 19 corresponds with the position 1 and produces the same connections, except that the motor-armature is now connected between the high-potential mains instead of the low-potential mains. The movements of the controller from position 19 through the intervening positions to the position 36 produces the same variations in resistance as the movement of the controller from the position 1 to the position 18. In other words, the movement of the controller from the position 19 to the position 22 cuts out step by step the starting resistance R' from the armature-circuit, and the movement of the controller from the position 22 to 36 leaves the armature-circuit unchanged and gradually cuts the field resistance $R^a$ into circuit with the field-winding. In order to prevent the connection between the low-potential mains upon a retrograde movement of the controller, the neutral wire is connected to the movable finger S, and, as indicated heretofore, this finger is moved out of engaging position as soon as the controller is moved beyond the last low-potential position—that is, beyond the position 18—and it cannot again be brought into engagement until after the controller has been moved to the off position. When it is desired to reverse the direction of rotation of the motor, the controller-cylinder is moved from the off position in a direction opposite to that heretofore considered and the contact-fingers are brought into engagement with the segments $S^3 \ A^3 \ B^3 \ C^3 \ D^2 \ R^3 \ F^3$ at the right of the diagram, as indicated by the position-numerals $1' \ 2' \ 3' \ 4'$. These segments of the controller provide for cutting out the field resistance, so that the field-excitation is always a minimum, and the variation of speed is brought about by cutting out the starting resistance $R'$ from the armature-circuit, so that in four steps in the reverse movement of the controller-handle the same range of speed is covered as in eighteen steps in the forward movement.

From the above it will be apparent that many alterations and modifications may be made in the specific structure herein disclosed without departing from the spirit and scope of my invention, and I therefore do not wish to be limited to the specific matter disclosed, but aim to cover by the terms of the appended claims all such alterations and modifications.

What I claim as new, and desire to secure by Letters Patent of the United States, is—

1. In a motor-control system, the combination of an electric motor, relatively low and high potential sources of supply, and switching means operable upon a forward movement to establish motor connections successively with said low and high potential sources of supply and upon a return movement to make only a portion of said connections.

2. In a motor-control system, the combination of an electric motor, a low-potential source of supply, a relatively-high-potential source of supply, and a switching means operable upon a forward movement to connect the motor-armature to said low-potential source and then to said high-potential source, and upon a return movement to make only the connection with said high-potential source.

3. In a motor-control system, the combination of an electric motor, a low-potential source of supply, a relatively-high-potential source of supply, a controlling-switch carrying fixed contacts and movable contacts operable upon a forward movement to connect an element of the motor first to said low-potential source of supply and then to said high-potential source of supply, and means for preventing a connection with said low-potential source of supply upon the return movement of said switch.

4. In a motor-control system, the combination of an electric motor, a low-potential source of supply, a relatively-high-potential source of supply, a cylindrical member carrying contact-segments, contact-fingers adapted to engage therewith, said segments and fingers being so constructed and arranged that in the forward movement of said cylinder one element of the motor will be connected in succession to said low and high potential sources, and means operative upon the return movement of said cylinder to move one or more of said contact-fingers out of engaging position to prevent a connection with said low-potential source of supply.

5. In a motor-controller, the combination of a cylindrical member carrying a contact-segment, a movable contact-finger adapted to engage therewith, and means operated by the rotation of said cylinder to move said finger into and out of engaging position.

6. In a motor-controller, the combination of a cylindrical member carrying a contact-segment, a spring-actuated contact-finger adapted to engage therewith and normally lying in engaging position, and means for moving said finger out of engaging position upon the return movement of said cylindrical member.

7. In a motor-controller, the combination of a cylindrical member carrying a contact-segment, a movable contact-finger adapted to engage therewith, and means comprising a cam carried by said cylindrical member for moving said finger into and out of engaging position.

8. In a motor-controller, the combination of a cylindrical member carrying contact-segments, contact-fingers adapted to engage therewith, one of said fingers being movable into and out of engaging position, and means comprising a cam carried by said cylindrical member constructed and arranged to retain said movable finger in engaging position throughout the forward movement of said cylindrical member from "off" position and then to hold said finger from its engaging position until the "off" position is again reached.

9. In a motor-control system, the combination of an electric motor, a low-potential source of supply, a relatively high potential source of supply, a starting resistance, and controlling means constructed and arranged to connect the motor-armature in series with the starting resistance to the low-potential source, then cut out the starting resistance to increase the motor speed, then connect said resistance in series with the armature without breaking the connection with the low-potential source, then break the latter connection and gradually cut out the resistance to increase further the motor speed.

10. In a motor-control system, the combination of an electric motor, a low-potential source of supply, a relatively high potential source of supply, a starting resistance, a field resistance, and controlling means constructed and arranged to connect the field-winding in series with the field resistance to one of said sources, and the armature in series with the starting resistance to the low-potential source, then cut out the starting resistance and vary the field resistance to increase the motor speed, then connect the starting resistance in series with the armature to the high-potential source without breaking the connection with the low-potential source, then break the latter connection, and then vary the starting and field resistances to increase further the motor speed.

In witness whereof I have hereunto set my hand this 5th day of April, 1904.

HAROLD E. WHITE.

Witnesses:
BENJAMIN B. HULL,
HELEN ORFORD.